K. OKAZAKI.
PROCESS OF MANUFACTURING SOY OR SAUCE SUBSTITUTE.
APPLICATION FILED MAY 2, 1907.

923,070.

Patented May 25, 1909.

WITNESSES
Chas. K. Davies.
Myron F. Clear.

INVENTOR
Keiichiro Okazaki,
By B. Singer.
Attorney

UNITED STATES PATENT OFFICE.

KEIICHIRO OKAZAKI, OF TOKYO, JAPAN.

PROCESS OF MANUFACTURING SOY OR SAUCE SUBSTITUTE.

No. 923,070.　　　Specification of Letters Patent.　　　Patented May 25, 1909.

Application filed May 2, 1907. Serial No. 371,532.

*To all whom it may concern:*

Be it known that I, KEIICHIRO OKAZAKI, a subject of the Emperor of Japan, residing at Tokyo, Japan, have invented new and useful Improvements in Processes of Manufacturing Soy or Sauce Substitutes, of which the following is a specification.

This invention relates to a new and useful process of making soy, a substitute for Japan or like sauce, possessing an agreeable flavor and rich in soluble phosphate and nutrient vegetable materials.

In the practice of my process, I first steam a mixture of desiccated wheat bran and bean cake, the latter consisting of the residue resulting from the removal by pressing, of the oil from the soja or other bean, and upon this mixture I transplant a whitish mold of the genus *Asperigillus* which I have designated "okazaki fungus". I then transplant upon a similar mixture of wheat bran and bean cake, a somewhat similar fungus which I have designated "diastarin fungus". The decomposition products which are formed by the action of these fungi are different kinds of "koji". The okazaki fungus acts in such a way on the steamed bean cake as to convert the proteid matters present into soluble compounds and the insoluble phosphates into soluble form. The okazaki fungus also secretes a particularly agreeable flavor. The diastarin fungus acts in such a way on the mixture as to convert the starch and similar matters present into sugar. The two kojis thus produced by the okazaki and diastarin fungi are then mixed and to the mixture is added brewer's yeast and the soluble portions of the mass extracted with water to which table salt, with or without other flavoring, is afterward added, producing the soy or Japan sauce substitute.

Figure 1:
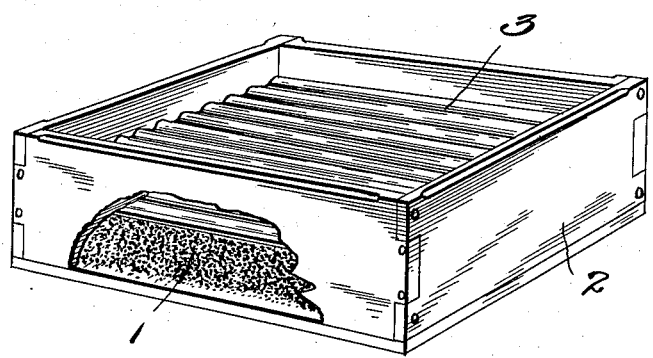
Figure 2:
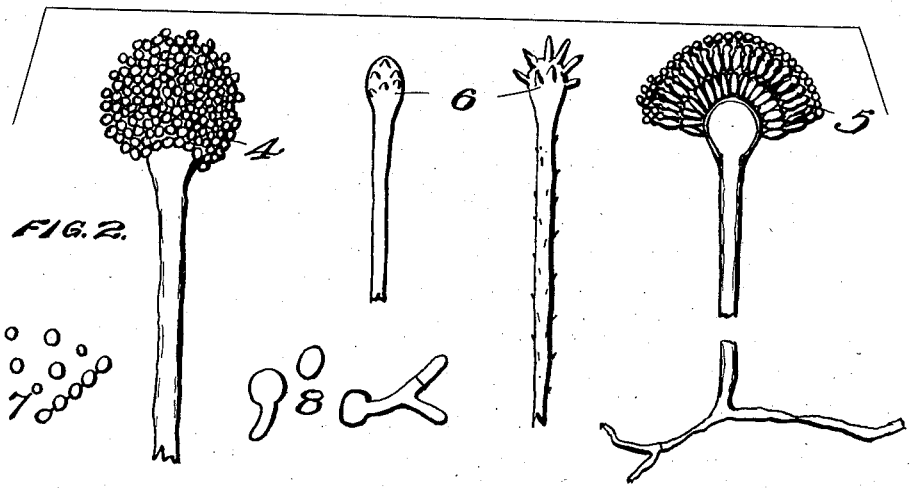
Figure 3:
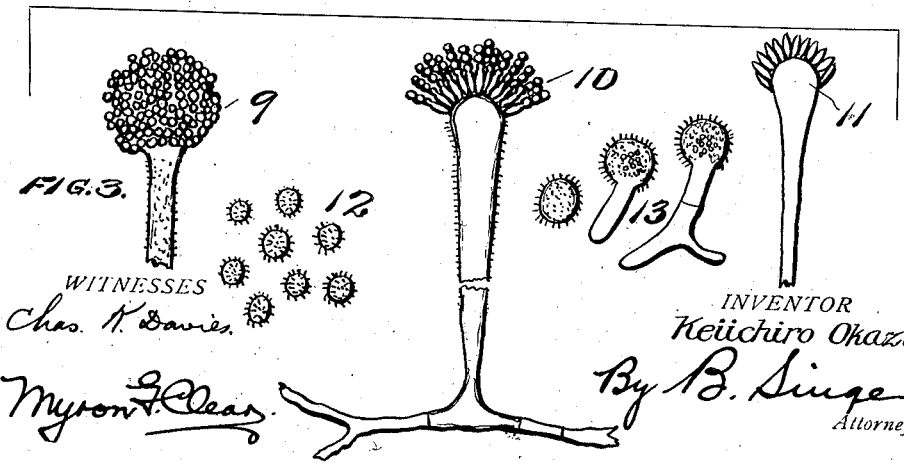

In order that my invention may be fully understood, I will describe it in detail in connection with the accompanying drawing forming a part of this specification and in which, Figure 1 is a perspective view of a box containing sawdust and bran used in the cultivation of the okazaki and diastarin fungi. Fig. 2 is a perspective view of the okazaki fungus and conidia thereof, and Fig. 3 is a perspective view of the diastarin fungus and conidia thereof.

In the cultivation of the okazaki and diastarin fungi, small wood particles preferably in the form of fine soft wood sawdust, are mixed with rice bran and the mixture 1 placed in a suitable container as box 2 (Fig. 1) and steamed. The mixture is then covered with a rice straw mat 3, and maintained at a temperature of about 20° to 30° C., preferably for several days. A mold will then be found to have formed on the mixture and, examined under a microscope, the mass will be seen to contain okazaki and diastarin fungi, besides monilia, mucor and yeasts. The okazaki and diastarin fungi are then each separated from the other kinds of fungi present and cultivated by the ordinary and well known method.

The okazaki fungus is a hitherto unknown species and belongs to the genus *Aspergillus*, being found in rice-bran. Its aerial mycellium has septa and produces short conidiophores the wall of which is slightly granulated and their ends are swollen into round or bar-shaped head and upon the whole surface or only on the upper side of that head ramified cylindrical or flask-shaped sterigmata are formed. The end of each sterigma is constricted into conidia, presenting a bead-like appearance. The conidia in young culture are pure white, but they assume a faint yellowish color when they grow older. The spores of the fungus are from 2.5 to 5.4 microns in diameter. Compared to *Aspergillus oryzae*, this fungus, besides emitting an agreeable odor, is smaller, has shorter conidiophores, the wall of which is slightly granulated, while the conidia, in contrast to yellowish green of oryzae, are snow white, and therefore it can be easily distinguished from the other. In whiteness it resembles *Aspergillus albus*, but the former can be easily distinguished from the latter by its yellowish color in old culture, the difference of temperature suitable for growth, larger conidia, granulated wall of conidiophores, emission of fragrant odor, and by the strong power of dissolving proteid matters.

Okazaki fungus grows in ordinary temperature on gelatin, agar-agar or steamed rice, the most favorable temperature for its growth being 25° to 30° C. During the growth the fungus secretes a powerful enzyme which rapidly dissolves proteid matters, cellulose, etc. At the same time, it converts insoluble phosphates combined with proteid and other matters into soluble forms. When the mold is cultivated on a solid medium containing 16% of gelatin and having added to it 2% of table salt, 0.2% of hydrochloric acid and 2% of sodium carbonate, such medium will be liquefied in six or seven days when placed in a warm room, showing how strong is the power of resistance to the acid and alkaline media and to neutral salt. The enzyme obtained from the infusion quickly dissolves fibrin, egg-albumen, gelatin, etc., and decomposes them. This fungus is illustrated in Fig. 2 of the accompanying drawing in which 4 shows the conidiophore the end being covered with conidia. 5 shows the conidiophore with the end covered with radially ramified sterigmata on which the conidia are formed. 6 shows two young conidiophores the more mature one of the two exhibiting granulation on its walls. 7 shows the conidia magnified somewhat more highly than the conidiophores and 8 illustrates the germination of the conidia, the latter being likewise more highly magnified than the conidiophores illustrated.

The diastarin fungus is a variety of *Aspergillus oryzae* and is found on rice-bran. Compared with the ordinary *Aspergillus* it is slightly richer in yellowish green color and has larger conidia and conidiophores. It secretes a far more powerful enzyme than ordinary *Aspergillus oryzae*, and the most favorable temperature of this enzyme for dissolving starch appears to be slightly lower than that for the other. In Fig. 3, I have illustrated this fungus as it appears under a microscope. In this figure, 9 is the conidiophore, the end being covered with conidia. 10 shows the conidiophore with the end covered with radiating sterigmata on which the conidia are formed. 11 is a young conidiophore. 12 shows the conidia magnified somewhat more highly than the conidiophores and 13 illustrates the germination of the conidia with the latter being likewise more highly magnified than the conidiophores.

Although both the diastarin fungus and the okazaki fungus belong to the genus *Aspergillus*, they are easily distinguishable from each other. The important distinctive differences between these two species may be thus tabulated:

| | Okazaki fungus. | Diastarin fungus. |
|---|---|---|
| 1. Color of conidia | Snow white | Greenish-yellow. |
| 2. Size of conidia | 2.5, 5.4 micron | 8, 9 micron. |
| 3. Conidiophore | Short and with its walls smooth or granulated. | Long and with its wall finely granulated. |
| 4. Sterigmata | Ramified | Non-ramified. |
| 5. Power of dissolving starch. | Weak | Strong. |
| 6. Power of dissolving proteid substances. | Strong | Weak. |
| 7. Flavor of the culture | Agreeable | No peculiar flavor. |

In the preparation of the koji ten parts of bean-cake well steamed by subjecting the cake previously moistened by sprinkling with water to steam are mixed with five parts of desiccated wheat bran. The mixture is brought to the temperature of about 20° C., and a small quantity of full grown conidia of okazaki fungus is added and the mass well mixed up. The mixture is then spread out in boxes and the latter are placed in a koji chamber, a temperature of 15° to 20° C. being maintained and the window of the room being opened now and then to admit air. In three or four days whitish spores of koji will usually appear. The other kind of koji from diastarin fungus is similarly produced by the use of the diastarin fungus on the mixture of steamed bean-cake and desiccated wheat bran but in such case the temperature in the koji chamber is maintained at from 23° to 27° C.

In preparing an infusion of the koji fifteen parts of koji produced with okazaki fungus and an equal amount of that produced with diastarin fungus as above set forth are mixed with 30 parts of warm water. Then 10 parts of beer yeast which has been washed with salt water and afterward pressed to remove said water, are mixed with 10 parts of pulverized quartz and 3 parts of diatomaceous earth, and the mixture is well kneaded into the consistency of clay. Ten parts of warm water are applied to it and the liquid is pressed out. The koji fluid is then added to this liquid at the rate of 1 to ½ per cent. of the latter, and the mixture cooled by means of filtered air. It is then stirred and left for three or four days. The fluid is then filtered and to it a suitable quantity of pure table salt is added and it is then left for a month or two to ripen. The fluid is then pasteurized and skimmed to bring it to a clear, transparent condition. Finally flavor-imparting materials as butter, pepper, onion, cinnamon, etc., are added in a suitable quantity, forming the soy or sauce substitute.

Having described my invention, I claim:

1. The herein described process which consists in cultivating okazaki fungus and diastarin fungus upon a medium comprising nitrogenous vegetable material, adding a readily diffusible liquid to the mass, separating the liquid and dissolved contents from said material and adding said liquid to a liquid containing yeast, substantially as described.

2. The herein described process which consists in cultivating okazaki fungus and diastarin fungus upon a medium comprising nitrogenous vegetable material, adding a readily diffusible liquid to the mass, separating the liquid and dissolved contents from said material, adding said liquid to a liquid containing yeast, removing solid matter therefrom and flavoring, substantially as described.

3. The herein described process which consists in separately cultivating okazaki and diastarin fungus upon a mixture of bean-cake and wheat bran, adding water to the mass, separating the liquid and dissolved contents from said material, adding it to a liquid containing brewer's yeast, separating the solid matter therefrom, and flavoring, substantially as described.

In testimony whereof I affix my signature in presence of two witnesses.

KEIICHIRO OKAZAKI.

Witnesses:
H. F. HAWLEY,
Y. FUKUKITA.